(12) United States Patent
Kweon et al.

(10) Patent No.: US 12,259,142 B2
(45) Date of Patent: Mar. 25, 2025

(54) COOKER

(71) Applicant: Samsung Electronics Co., Ltd., Suwon-si (KR)

(72) Inventors: Sooncheol Kweon, Suwon-si (KR); Sanggyun Ye, Suwon-si (KR); Seungwoo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 774 days.

(21) Appl. No.: 17/497,638

(22) Filed: Oct. 8, 2021

(65) Prior Publication Data

US 2022/0026077 A1 Jan. 27, 2022

Related U.S. Application Data

(63) Continuation of application No. PCT/KR2020/004550, filed on Apr. 3, 2020.

(30) Foreign Application Priority Data

Apr. 10, 2019 (KR) .................. 10-2019-0041978

(51) Int. Cl.
*F24C 15/32* (2006.01)
*A21B 3/04* (2006.01)
*A47J 27/04* (2006.01)

(52) U.S. Cl.
CPC .............. *F24C 15/327* (2013.01); *A21B 3/04* (2013.01); *A47J 27/04* (2013.01); *F24C 15/325* (2013.01); *A47J 2027/043* (2013.01)

(58) Field of Classification Search
CPC ....... A21B 3/04; A47J 2027/043; A47J 27/04; F24C 15/18; F24C 15/325; F24C 15/327
(Continued)

(56) References Cited

U.S. PATENT DOCUMENTS 7,091,454 B2    8/2006    Cho et al.
9,468,328 B2 *   10/2016    Yang ..................... A47J 27/04
(Continued)

FOREIGN PATENT DOCUMENTS

CN      206675402 U    11/2017
CN      107440488 A    12/2017
(Continued)

OTHER PUBLICATIONS

Communication pursuant to Article 94(3) EPC dated Jan. 31, 2024, in connection with European Patent Application No. 20787640.0, 7 pages.

(Continued)

*Primary Examiner* — Dana Ross
*Assistant Examiner* — Joseph W Iskra

(57) ABSTRACT

Disclosed is a cooking apparatus with a cooktop. The cooking apparatus includes: a cooker body including a cooking compartment and a storage compartment below the cooking compartment; a drawer including a storage space, and sliding the drawer into and out of the storage compartment closes and opens the storage space; a steam supplier configured to generate steam and supply the generated steam to the cooking compartment; and a water tank configured to store water for generating the steam, and provided in a certain region of the storage compartment independently of the drawer to be pushed in or pulled out.

13 Claims, 11 Drawing Sheets

(58) Field of Classification Search
USPC .......................................................... 219/401
See application file for complete search history.

(56) References Cited

U.S. PATENT DOCUMENTS

| | | | |
|---|---|---|---|
| 9,565,964 | B2 | 2/2017 | Yang et al. |
| 2007/0215592 | A1* | 9/2007 | Wang .................... F24C 15/327 |
| | | | 219/400 |
| 2017/0311394 | A1 | 10/2017 | Shibuya et al. |
| 2020/0146498 | A1 | 5/2020 | Lim et al. |

FOREIGN PATENT DOCUMENTS

| | | |
|---|---|---|
| DE | 102007041822 A1 | 3/2009 |
| EP | 2037183 A1 | 3/2009 |
| EP | 2775216 A2 | 9/2014 |
| EP | 2896737 A1 | 7/2015 |
| JP | 2011085301 A | 4/2011 |
| KR | 10-2018-0126237 A | 11/2018 |
| KR | 20180126237 A * | 5/2019 |
| WO | 2010/090043 A1 | 8/2010 |

OTHER PUBLICATIONS

Office Action issued Mar. 21, 2024, in connection with Korean Patent Application No. 10-20190041978, 16 pages.
International Search Report dated Jul. 22, 2020 in connection with International Patent Application No. PCT/KR2020/004550, 2 pages.
European Patent Office, "Supplementary European Search Report" issued Apr. 12, 2022, in connection with European Patent Application No. 20787640.0, 10 pages.

* cited by examiner

COOKER

CROSS-REFERENCE TO RELATED APPLICATIONS

This application is a continuation of International Application No. PCT/KR2020/004550 filed on Apr. 3, 2020, which claims priority to Korean Patent Application No. 10-2019-0041978 filed on Apr. 10, 2019, the disclosures of which are herein incorporated by reference in their entirety.

BACKGROUND

1. Field

The disclosure relates to a cooking apparatus, and more particularly to a steam oven with a cooktop on the top thereof.

2. Description of Related Art

There is an all-in-one cooking apparatus that includes a steam oven having a cooking compartment in which an ingredient to be cooked is put, and a steam generator which is to supply steam to the cooking compartment; and a cooktop placed on the top of the steam oven and heating a cooking container. Further, a drawer is placed under the steam oven so as to support the steam oven and store a cooking utensil or an ingredient to be cooked.

The steam generator receives water from a water tank to generate steam. The water tank may be placed anywhere at an upper, lower, back, left or right side of the steam oven. However, it is difficult to secure a space for placing the water tank in the all-in-one cooking apparatus because the cooktop is provided on the top of the steam oven. Further, in a case where the water tank is placed at the back side of the steam oven, it is difficult to put in or take out the water tank in order to replenish the water tank with water. In a case where the water tank is placed at the left or right sides of the steam oven, not only it is inconvenient to put in or take out the water tank but also a problem arises in that a lateral occupancy space of the cooking apparatus is increased because the all-in-one cooking apparatus is widened sideways.

Taking such problems into account, U.S. Pat. No. 9,468,328 has disclosed a cooking apparatus in which a water tank is placed in a storage space of a drawer. This cooking apparatus has a structure that a water flow path is blocked between the water tank and the steam generator when the drawer is pulled out and the water flow path is connected between the water tank and the steam generator when the drawer is pushed in. Thus, the cooking apparatus, in which the water tank is stationarily mounted to the storage space of the drawer, has problems that interference occurs while the stored containers or utensils needed for cooking are being stored, and water supply to the steam generator is cut off and cooking is stopped whenever the storage space is opened during the cooking.

Accordingly, an aspect of the disclosure is to provide a cooking apparatus in which water is supplied to generate steam without being affected by operations of pulling out or pushing in a drawer.

SUMMARY

According to an embodiment of the disclosure, there is provided a cooking apparatus. The cooking apparatus includes: a cooker body including a cooking compartment and a storage compartment below the cooking compartment; a drawer including a storage space, and sliding the drawer into and out of the storage compartment closes and opens the storage space; a steam supplier configured to generate steam and supply the generated steam to the cooking compartment; and a water tank configured to store water for generating the steam, and provided in a region of the storage compartment independent from the sliding of the drawer.

The cooking apparatus may further include a cooktop provided on a top of the cooker body above the cooking compartment.

The storage compartment may include a water tank guide configured to support the sliding of the water tank in and out of the storage compartment.

The steam supplier may include a steam generator configured to heat up water to be turned into steam, and a water supplying pipe provided in the cooker body to supply water between the water tank and the steam generator.

The water tank may include a connector configured to removably couple to a water flow path between the water tank and the water supplying pipe.

The connector may be configured to removably couple the water flow path between the water tank and the water supplying pipe based on sliding the water tank into and out of the water tank guide.

The water tank may include a top cover, and the connector may be provided in the top cover.

The water tank may be independently provided within the storage space of the drawer.

The drawer may include an accommodation space partitioned in the storage space and configured to accommodate the water tank.

The water tank may be provided between the storage compartment and the cooking compartment.

The storage compartment may include a door configured to open or close the region of the storage compartment for the water tank.

The water tank may include a water inlet through which water is injected, and the water inlet may be installed in the storage compartment and exposed to an outside.

The cooking apparatus may further include a water sensor provided in the water supplying pipe and configured to detect presence of water.

The steam generator may include a spray nozzle configured to spray water supplied from the water supplying pipe, a heater configured to heat up the sprayed water to be turned into steam, and a fan configured to circulate the steam in the cooking compartment.

The heater may surround the fan, and the spray nozzle may be disposed toward a rotary shaft of the fan.

The fan may include a water guide for radially guiding the sprayed water.

As described above, a cooking apparatus according to the disclosure is free from heat because a water tank is provided independently of a drawer of a storage compartment positioned under a cooker body.

In the cooking apparatus according to the disclosure, the water tank can be replenished with water or cleaned regardless of operations of pushing in or pulling out the drawer, and it is possible to avoid interference with cooking utensils or ingredients to be cooked, which are stored in the drawer.

Further, the steam generator continuously receives water irrespective of the operations of pushing in or pulling out the drawer, and thus generates steam without interruption.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
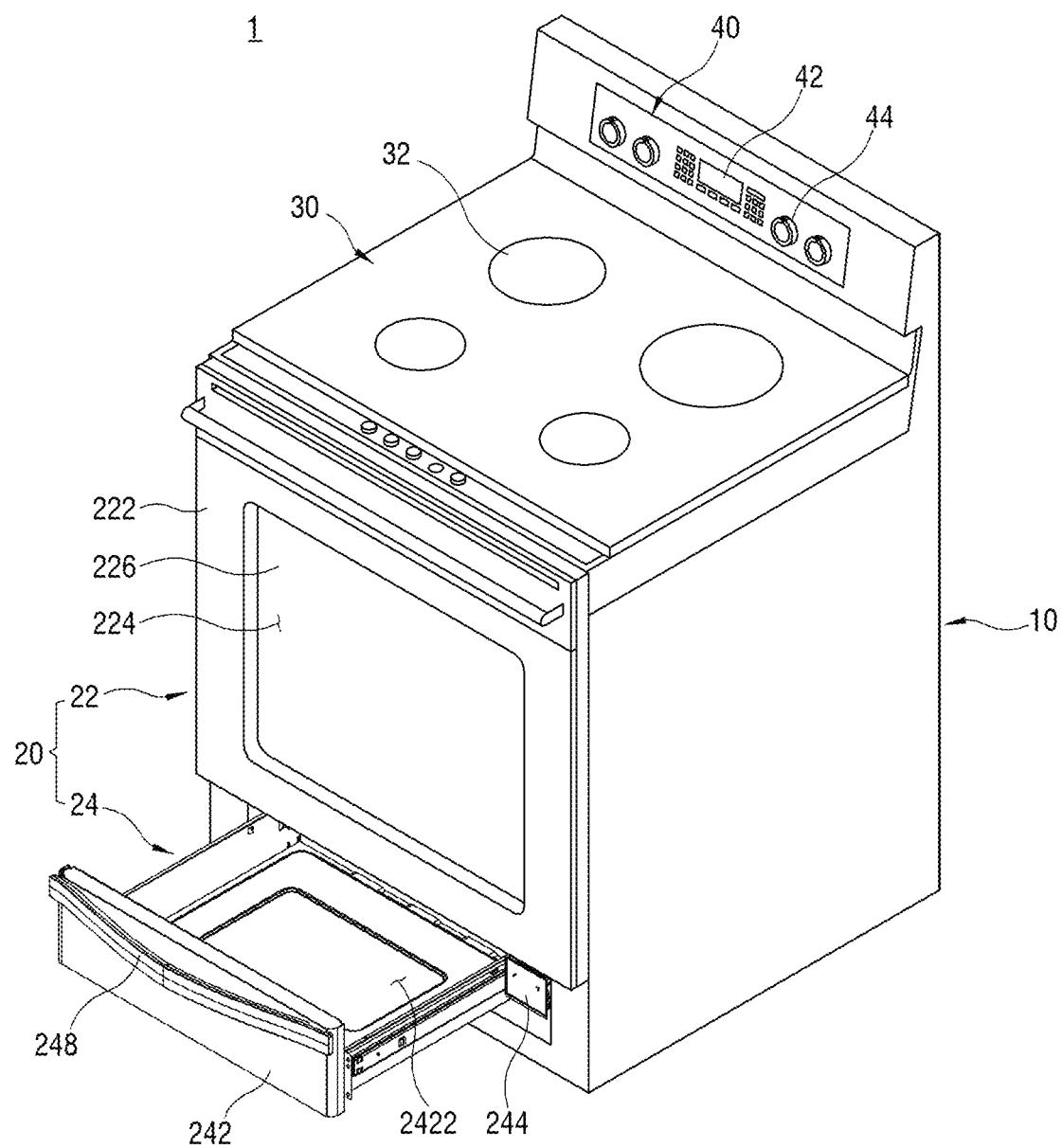
FIG. 1 illustrates a cooking apparatus according to a first embodiment of the disclosure.
Figure 2:
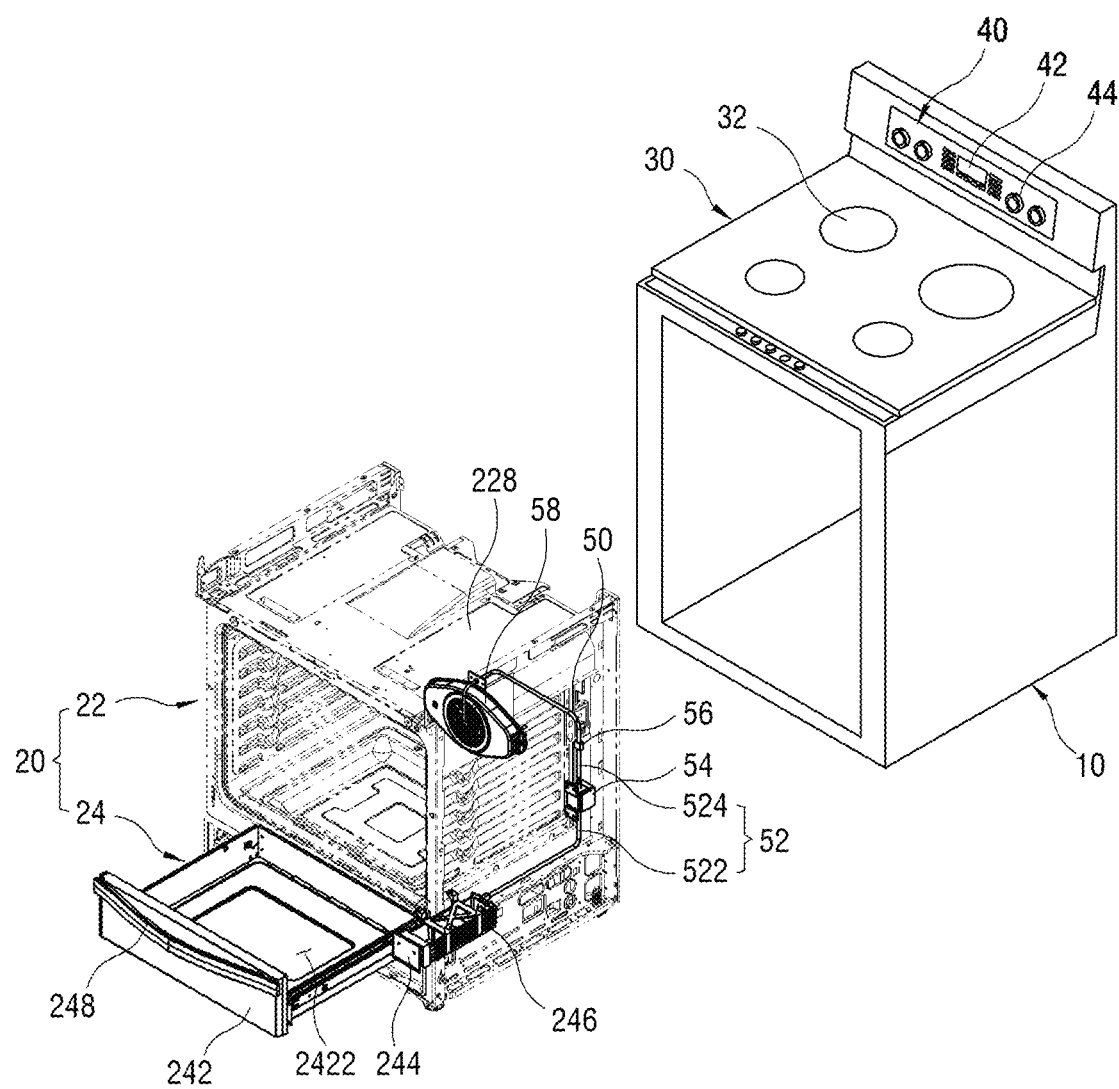
FIG. 2 is an exploded perspective view of the cooking apparatus according to the first embodiment of the disclosure.

Below, embodiments will be described in detail with reference to accompanying drawings. FIGS. 1 and 2 are a perspective view and an exploded perspective view of a cooking apparatus 1 according to a first embodiment of the disclosure, respectively.

Referring to FIGS. 1 and 2, the cooking apparatus 1 includes a case 10 forming an outer appearance, a cooker body 20 provided in the case 10 and performs cooking for an ingredient to be cooked, a cooktop 30 placed on the cooker body 20 and allowing food to be put and cooked thereon, a control panel 40 provided in the case 10, and a steam supplier 50 provided in the cooker body 20. The cooking apparatus 1 may further include a controller (not shown) for controlling the steam supplier 50 based on a command input through the control panel 40 or information received from various sensors.

The case 10 forms the outer appearance of the cooking apparatus 1. The case 10 accommodates the cooker body 20 therein, and the cooktop 30 is put on the case 10. The cooktop 30 may include an oven heater 32 on which a cooking container filled with an ingredient to be cooked is put as a second cooking utensil. The cooktop 30 may for example include an induction range, an electric range, a gas range, etc.

The control panel 40 may include a display 42 for displaying various pieces of cooking information, and a control knob 44 for controlling various cooking modes of the cooking apparatus 1.

The cooker body 20 includes a cooking compartment 22 in which food put in a center region thereof is cooked while being closed, and a storage compartment 24 placed under the cooking compartment 22.

The cooking compartment 22 includes a cooking space 224 approximately shaped like a rectangular box of which a front side is opened. The cooking compartment 22 refers to a space in which an ingredient to be cooked is put, and may include a shelf on which an ingredient to be cooked or a cooking container is put. The cooking compartment 22 includes a door 222 provided in the opened front side.

The door 222 is hinged at a lower side to the cooker body 20 so as to swing frontward and open the opened front side of the cooking compartment 22. The door 222 includes a sight window 226 made of glass or the like transparent material through which a process of cooking an ingredient to be cooked in the cooking compartment 22 can be seen from the outside.

The storage compartment 24 is placed under the cooking compartment 22 and supports the cooking compartment 22. The storage compartment 24 includes a drawer 242 in which cooking utensils, cooking containers, ingredients to be cooked, etc. are stored; a water tank 244; and a water tank guide 246 supporting the water tank 244 sliding to be pushed in or pulled out. The storage compartment 24 may be formed separately from or integrally with the cooking compartment 22.

The drawer 242 may be provided to slide to be pushed into or pulled out from the storage compartment 24. A user may hold a drawer grip 248 and pushes or pulls the drawer 242 into or out of the storage compartment 24.

The water tank 244 stores water to be supplied to the steam supplier 50 for generating steam. The water tank 244 is provided in a certain region of the storage compartment 24 independent of an occupancy region of the drawer 242 not to interfere with the sliding of the drawer 242 being pushed in or pulled out. The water tank 244 shown in FIGS. 1 and 2 is arranged adjacent to the right side of the drawer 242, but not limited thereto and may be placed at the left, upper or lower side of the drawer 242. Like this, the water tank 244 is provided independently of the drawer 242 of the storage compartment 24 placed under the cooking compartment 22, so that the water tank 244 can be easily separated to be replenished with water or cleaned regardless of the operations of pushing in or pulling out the drawer 242, and be prevented from interference with cooking utensils or ingredients to be cooked, which are stored in the drawer 242, without being affected by heat. In particular, a steam generator 58 continuously receives water regardless of the operations of pushing in or pulling out the drawer 242, thereby generating steam without interruption.

The water tank 244 may be installed in a certain region of the storage compartment 24 so that its head 2443 (see FIG.

6) can be directly exposed to the front, or the water tank 244 may be covered up by a door for opening and closing the certain region.

The water tank guide 246 may be stationarily installed at the right side of the drawer 242 of the storage compartment 24 and support the water tank 244 to slide to be pushed in or pulled out.

Figure 3:
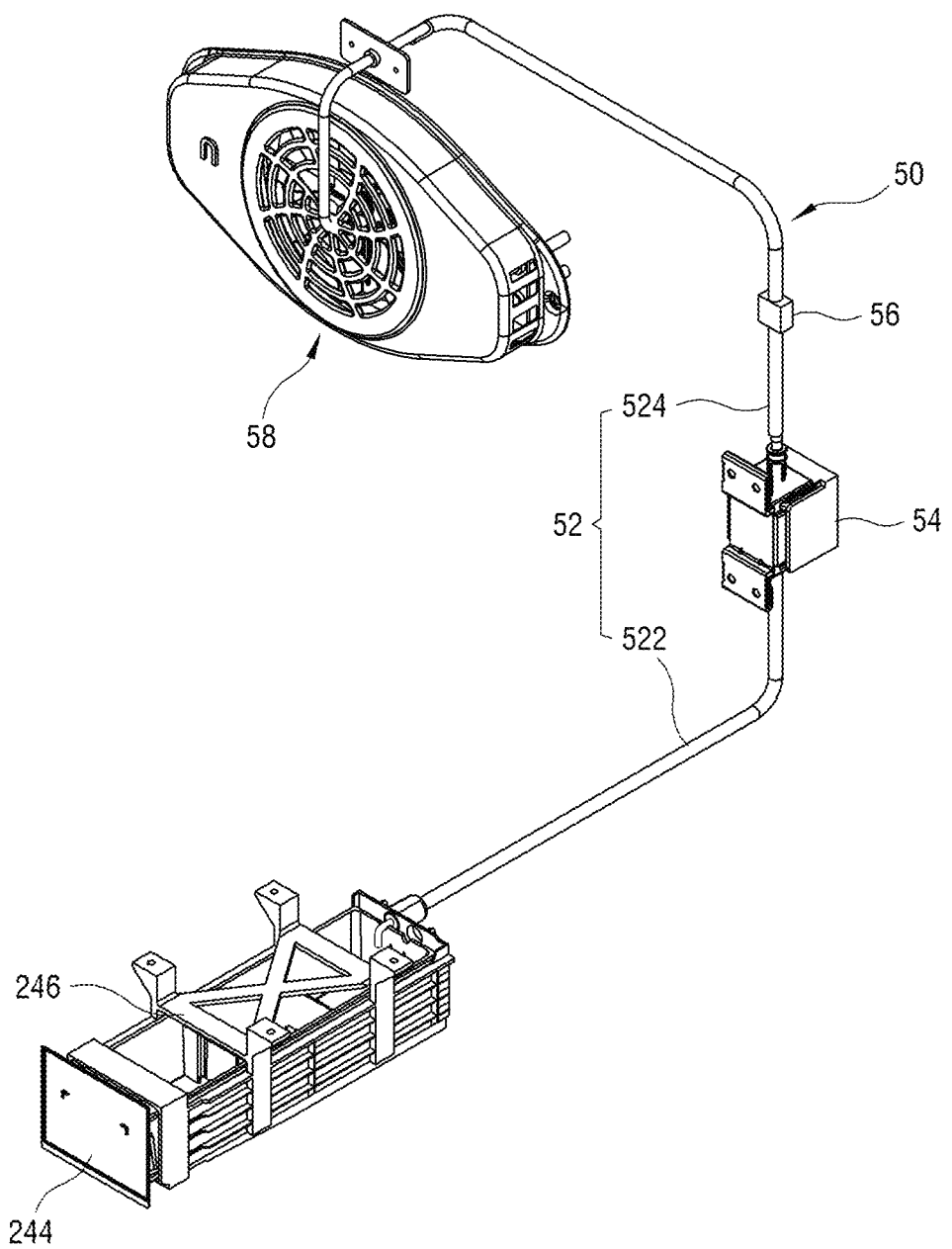
FIG. 3 is a perspective view of a steam supplier in FIG. 2.

FIG. 3 is a perspective view of the steam supplier 50 according to an embodiment of the disclosure. The steam supplier 50 includes a water supplying pipe 52, a pump 54, a water sensor 56, and the steam generator 58.

Referring to FIGS. 2 and 3, the water supplying pipe 52 refers to a tube for supplying water between the water tank 244 and the steam generator 58. The water supplying pipe 52 includes a first connection pipe 522 for connecting the water tank 244 and the pump 54, and a second connection pipe 524 connecting the pump 54 and the steam generator 58. The first connection pipe 522 includes one end portion supported on the water tank guide 246, and is extended backward from the storage compartment 24, extended upward at the back side, and connected to the pump 54. The second connection pipe 524 is extended from the pump 54 upward along the back of the cooker body 20, extended frontward on a top surface, and connected to the steam generator 58 inside the cooking compartment 22 via a heat insulator 228 surrounding the cooking compartment 22.

The water supplying pipe 52 may be generally inclined toward the water tank 244 so that water remaining after steam cooking is completed can return to the water tank 244. Alternatively, the water supplying pipe 52 may additionally include a water returning path instead of the water supplying path to return the remaining water.

The pump 54 is provided between the water tank 244 and the steam generator 58, in other words, between the first connection pipe 522 and the second connection pipe 524 of the water supplying pipe 52. The pump 54 pumps up water stored in the water tank 244 and supplies the water to the steam generator 58.

The water sensor 56 is provided in the second connection pipe 524 of the water supplying pipe 52 between the pump 54 and the steam generator 58 and detects whether water is supplied normally or abnormally. For example, when it is detected by the water sensor 56 that no water flows in the water supplying pipe 52, the operations of the steam generator 58 are stopped and it is warned that malfunction occurs. Therefore, a user may replenish the water tank 244 with water after checking whether water is present in the water tank 244. When no water flows in the water supplying pipe 52 even through water is present in the water tank 244, it may be identified that the pump 54 or the water sensor 56 is faulty.

The steam generator 58 heats up water supplied through the water supplying pipe 52, thereby generating steam. The steam generator 58 may be installed inside or outside the cooking compartment 22 (see FIG. 2).

Figure 4:
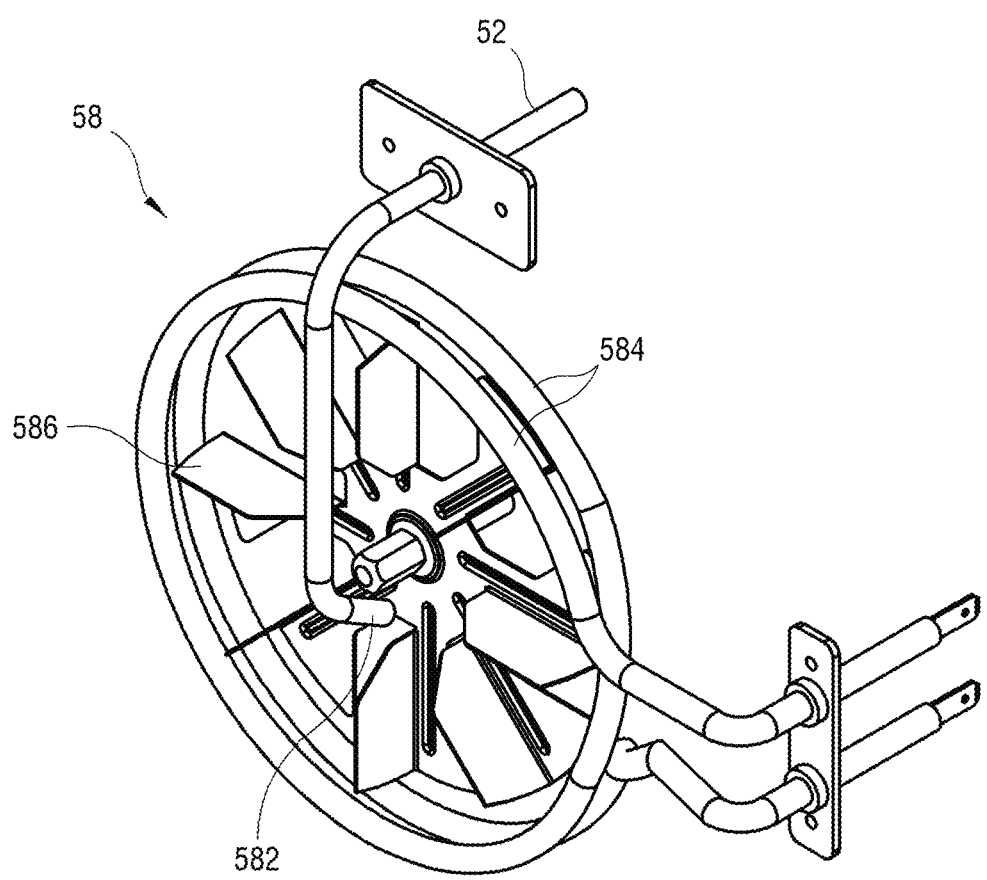
FIG. 4 is a perspective view of a steam generator according to an embodiment of the disclosure.

FIG. 4 is a perspective view of the steam generator 58 according to an embodiment of the disclosure.

Referring to FIG. 4, the steam generator 58 includes a spray nozzle 582 for spraying water, a heater 584 for turning the sprayed water into steam, and a fan 586 for circulating the steam in the cooking compartment 22.

The spray nozzle 582 sprays water, which is intermittently received from the water supplying pipe 52, in the form of mist. The spray nozzle 582 is positioned around the shaft of the fan 586, and the heater 584 surrounding the fan 586 turns water into steam.

The heater 584 heats up water sprayed out in the form of mist by the spray nozzle 582, thereby instantaneously turning the sprayed water into steam. The heater 584 may surround the fan 586 circularly many times.

The fan 586 disperses water, sprayed out in the form of mist, toward the heater 584, and circulates the steam into the cooking compartment 22. The fan 586 may spin based on a motor. The motor may be controlled under control of the controller. The controller may include a heater compensation algorithm to make up for temperature change and thermal loss in the cooking compartment 22 due to water supply.

Figure 5:
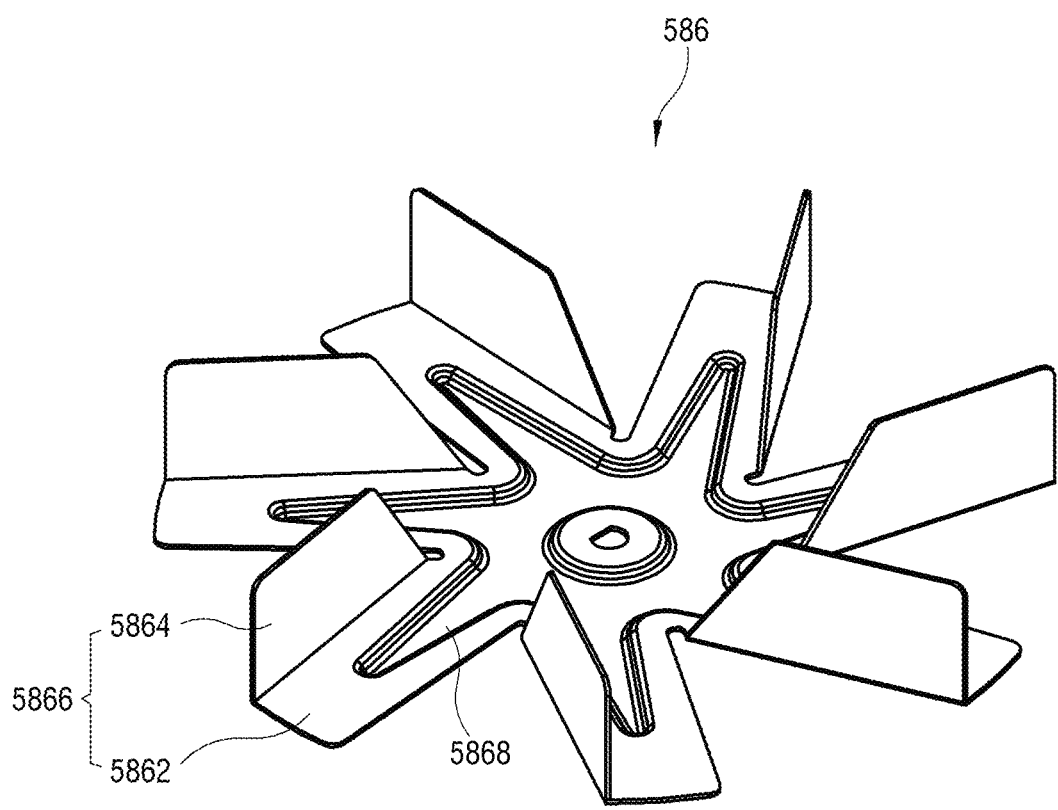
FIG. 5 is a perspective view of a fan in FIG. 4.

FIG. 5 is a perspective view of the fan 586 in FIG. 4. The fan 586 may include a plurality of, for example, seven blades 5866 from the center to the circumference. The blades 5866 includes first vanes 5862 radially extended in a horizontal direction, and second vanes 5864 integrally bent from a radial edge of the first vane 5862 and extended upward. The first vane 5862 may include a groove 5868 radially extended from the center. With such a structure, the blades 5866 can guide mist of water, which is sprayed from the center by the spray nozzle 582, to move toward the heater 584 while spinning.

Figure 6:
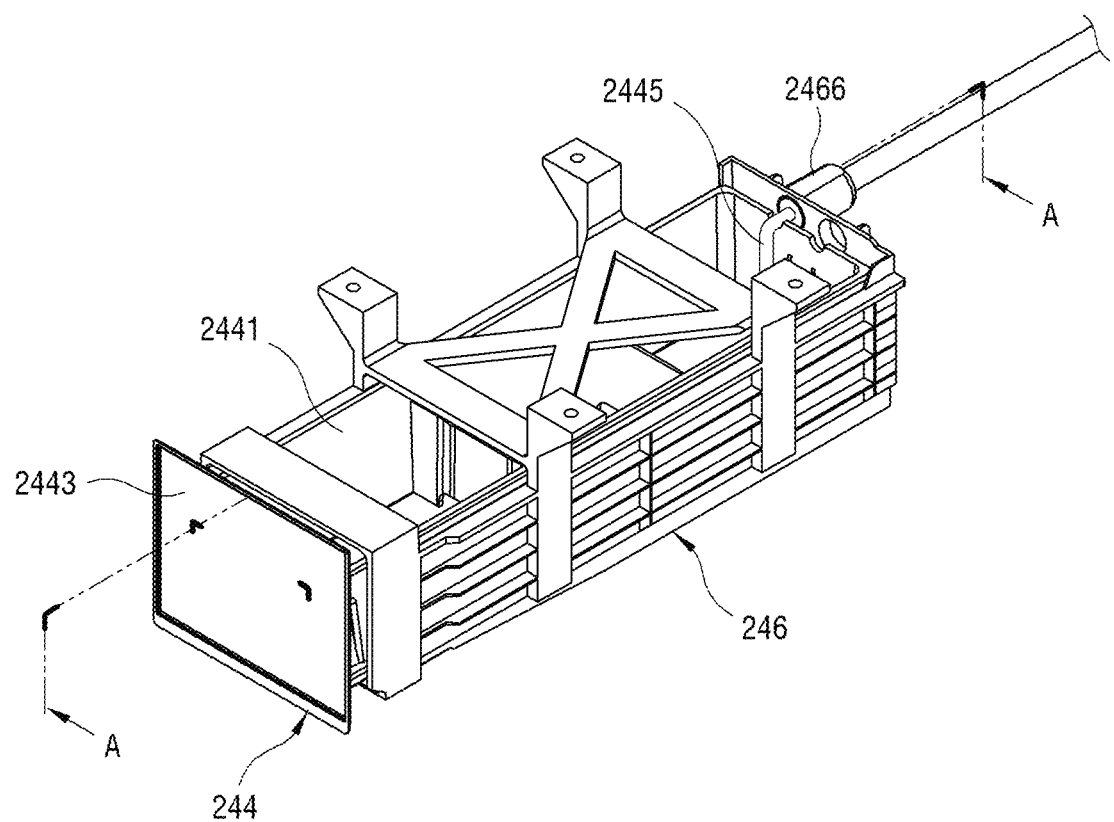
FIGS. 6 and 7 are perspective views of assembled and separated states between a water tank and a water tank guide according to the first embodiment of the disclosure, respectively.
Figure 7:
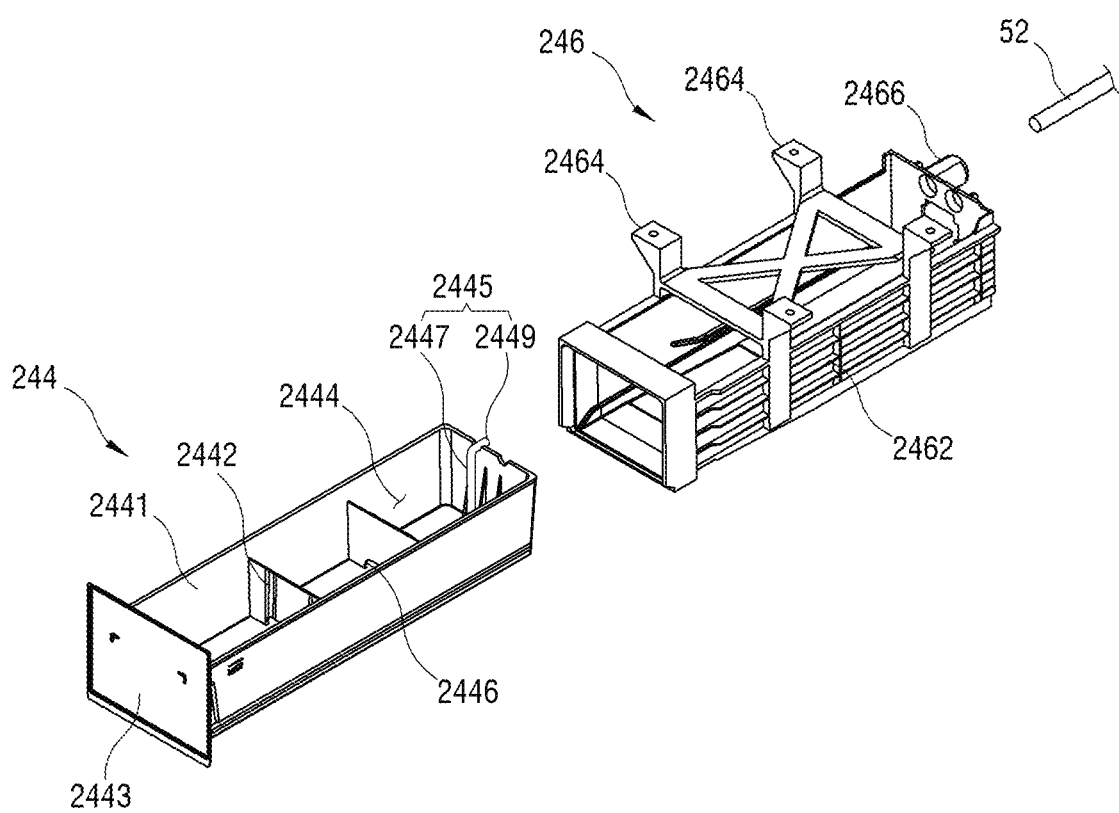
Figure 8:
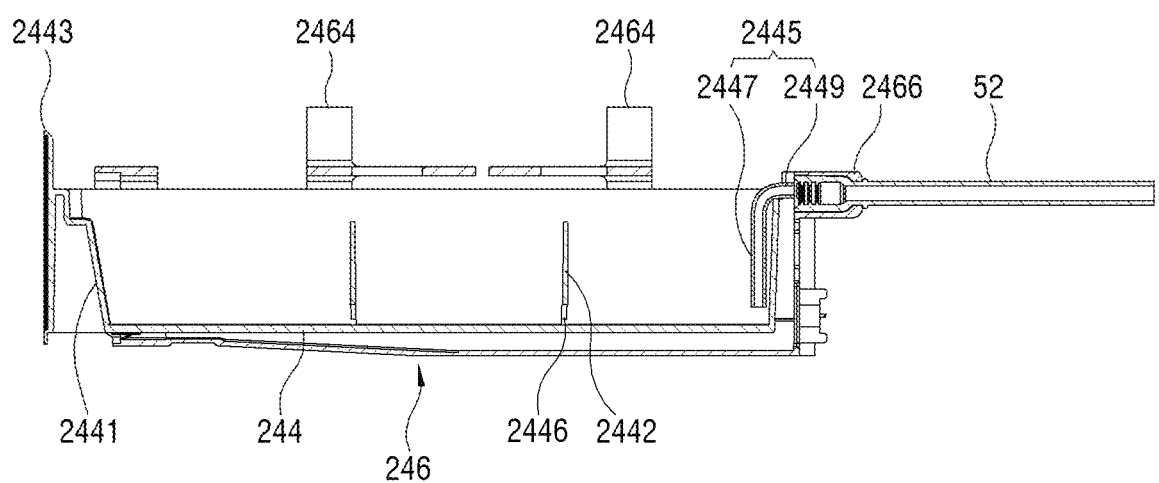
FIG. 8 is a cross-sectional view taken along line A-A of FIG. 6.

FIGS. 6 and 7 are perspective views of assembled and separated states between the water tank 244 and the support guide according to the first embodiment of the disclosure, respectively, and FIG. 8 is a cross-sectional view taken along line A-A of FIG. 6.

Referring to FIGS. 6 to 8, the water tank 244 includes a storage main body 2441 shaped like a quadrangular box opened upward, the head 2443 provided in the front of the storage main body 2441, and a connector 2445 provided in the back.

The storage main body 2441 includes at least one partition 2442 in a lengthwise direction thereof. The storage main body 2441 includes a plurality of water storage spaces 2444 formed by the partitions 2442. The partition 2442 is formed with a communicating portion 2446 through which water flows between the plurality of water storage spaces 2444.

The storage main body 2441 may be variously shaped without being limited to the quadrangular box. Further, the storage main body 2441 may have a single water storage space 2444 without the partitions 2442. The storage main body 2441 is not necessarily opened upward, but may include a space to be filled with water, and an inlet through which water is injected into this space.

The head 2443 is exposed to the front of the storage compartment 24 (see FIG. 2), and used as a grip of which a user takes hold to push in or pull out the water tank 244. The head 2443 may be formed to have a cross-section larger than the width of the storage main body 2441.

The connector 2445 includes a vertical portion 2447 extended upward from the bottom of the water storage space 2444 of the storage main body 2441, and a horizontal portion 2449 horizontally extended backward. The connector 2445 transfers water filled in the water storage space 2444 to the water supplying pipe 52. The connector 2445 may be stationarily supported on the storage main body 2441. Therefore, when the water tank 244 slides to be pushed in or pulled out, the connector 2445 also slides. In result, the end of the horizontal portion 2449 is fastened to the end of the water supplying pipe 52 supported in the water tank guide 246 when pushed in, but separated from the end of the water supplying pipe 52 when pulled out.

The water tank 244 may further include a top cover for covering the opened top. In this case, the connector 2445 may be stationarily supported at the back end of the top cover.

The water tank guide 246 includes a guide main body 2462 having a space for accommodating the water tank 244, a stationary supporter 2464 stationarily supporting the guide main body 2462 on the storage compartment 24 (see FIG. 2), and a water supplying-pipe supporter 2466 provided in the back of the guide main body 2462.

The guide main body 2462 is opened frontward so that the water tank 244 can slide to be pushed in or pulled out. The guide main body 2462 accommodates only the storage main body 2441 except the head 2443.

The stationary supporter 2464 is fastened to the ceiling of the space, in which the guide main body 2462 is installed, by, for example, a screw in the storage compartment 24. Alternatively, the stationary supporter 2464 may be fastened to the lateral sides or bottom of the space in which the guide main body 2462 is installed.

The water supplying-pipe supporter 2466 is shaped like a tub and provided on a path along which the horizontal portion 2449 of the connector 2445 moves when the water tank 244 is pushed in or pulled out. The end of the water supplying pipe 52 is inserted in and fitted to the water supplying-pipe supporter 2466. When the water tank 244 is pushed in or pulled out, the horizontal portion 2449 of the connector 2445 is fastened to or separated from the end of the water supplying pipe 52 fitted to the water supplying-pipe supporter 2466. In this case, the connector 2445 and the water supplying pipe 52 are tightly fastened and sealed to prevent water leak.

Figure 9:
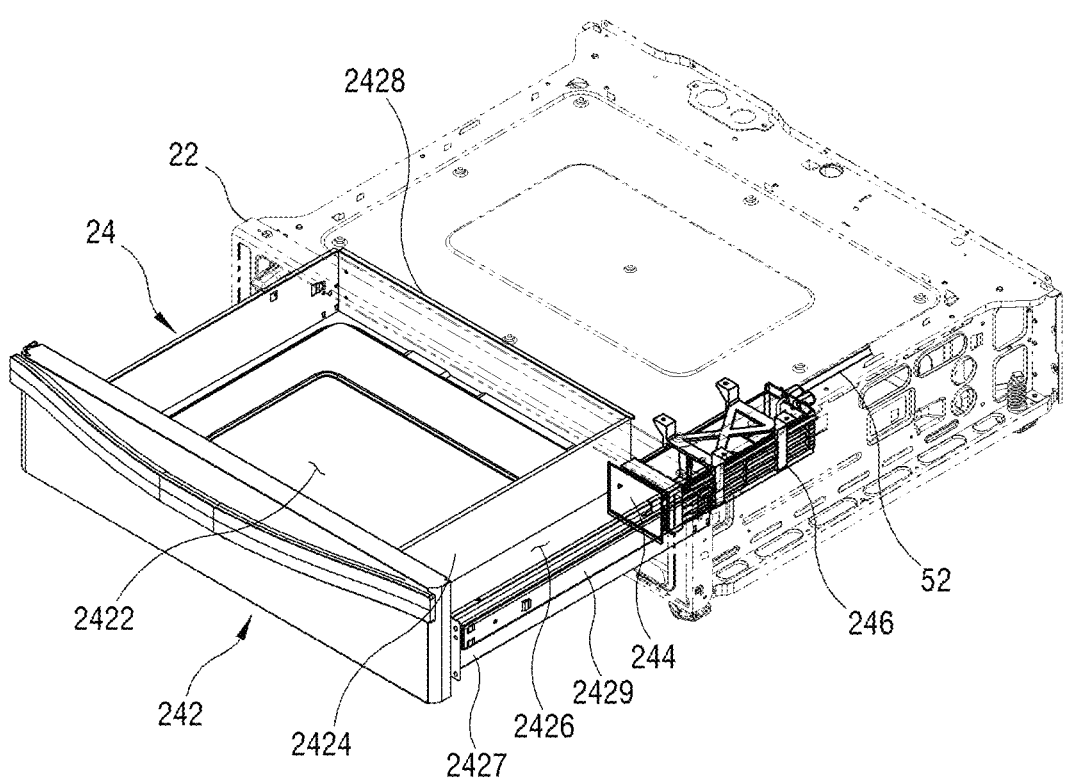
FIG. 9 is a perspective view showing an arranged state of a water tank according to a second embodiment of the disclosure.

FIG. 9 is a perspective view showing an arranged state of the water tank 244 according to a second embodiment of the disclosure.

Referring to FIG. 9, the drawer 242 includes a storage space 2422, and a accommodation space 2426 in which the water tank 244 is put independently. In other words, the water tank 244 and the water tank guide 246 are installed in the storage compartment 24 without being in contact with the accommodation space 2426 of the drawer 242. The accommodation space 2426 is formed separately from the storage space 2422 by a right wall 2427 of the drawer 242 and a partition wall 2424. In the accommodation space 2426, a real wall 2428 of the drawer 242 may be removed in order to prevent interference with the water tank guide 246 while the drawer 242 is sliding to be pushed in or pulled out.

The right wall 2427 of the drawer 242 may be provided with a rail 2429 on the outer side thereof for sliding movement of the drawer 242. The water tank guide 246, which supports the water tank 244 to slide to be pushed in or pulled out, is stationarily supported on the storage compartment 24 above the accommodation space 2426.

In this way, the water tank 244 is independently provided in the drawer 242 regardless of the sliding of the drawer 242 to be pushed in or pulled out, thereby not only preventing interference with cooking utensils, cooking containers, or ingredients to be cooked stored in the storage space of the drawer 242, but also continuously supplying water to the steam generator 58 even when the drawer 242 is pushed in or pulled out.

Figure 10:
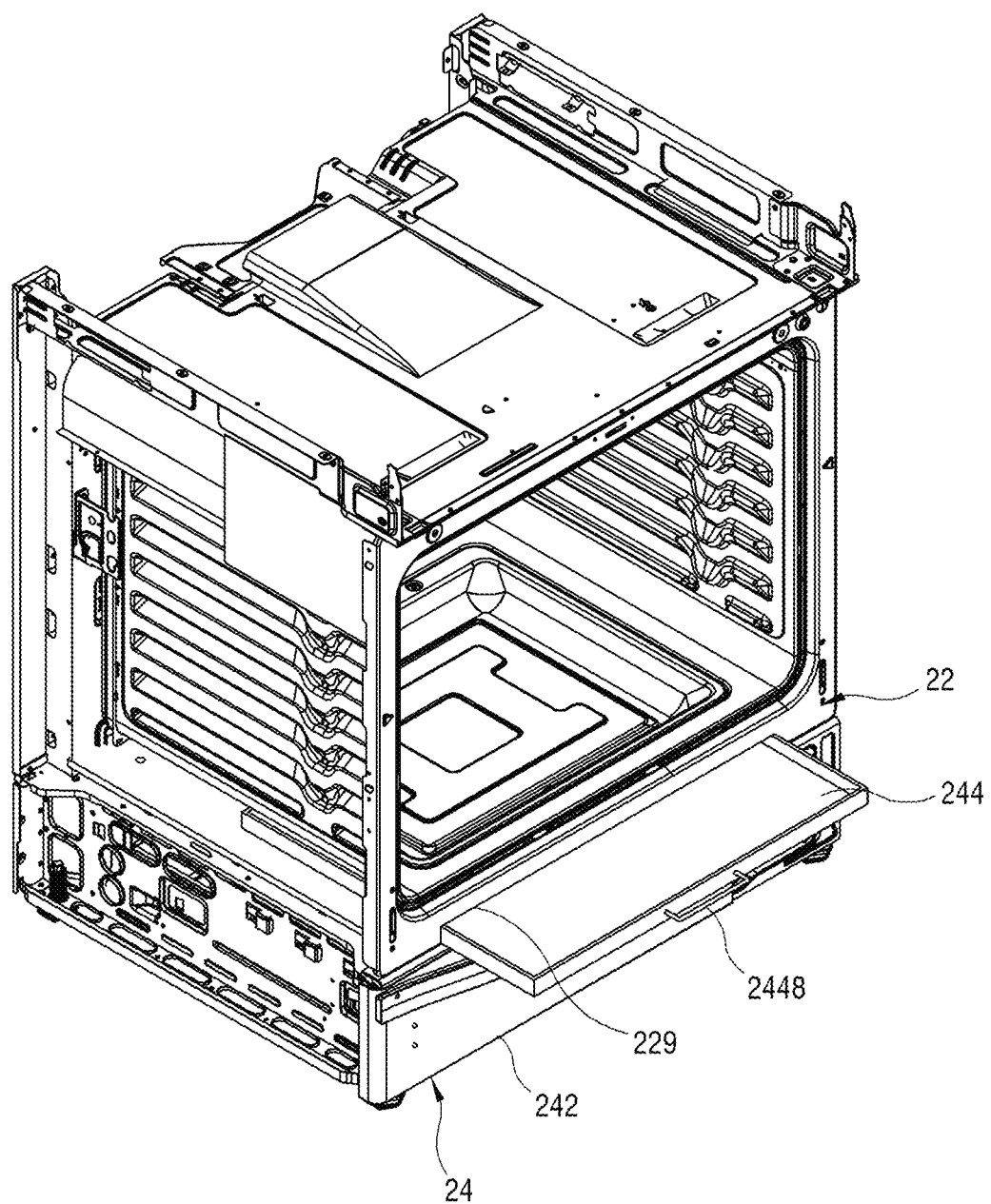
FIG. 10 is a perspective view showing an arranged state of a water tank according to a third embodiment of the disclosure.

FIG. 10 is a perspective view showing an arranged state of the water tank 244 according to a third embodiment of the disclosure.

Referring to FIG. 10, the water tank 244 may be arranged between the storage compartment 24 provided with the drawer 242 and the cooking compartment 22. The water tank 244 may be shaped like a box having a space in consideration of an installed position, i.e., taking the height and width of the lower end portion of the cooking compartment 22. A storage insertion portion 229 is provided between the cooking compartment 22 and the storage compartment 24, so that the water tank 244 can be inserted in the storage insertion portion 229. Alternatively, the storage insertion portion 229 may be provided at an upper side of the storage compartment 24. The water tank 244 may include a grip 2448 of which a user can take hold to push in or pull out the water tank 244.

Figure 11:
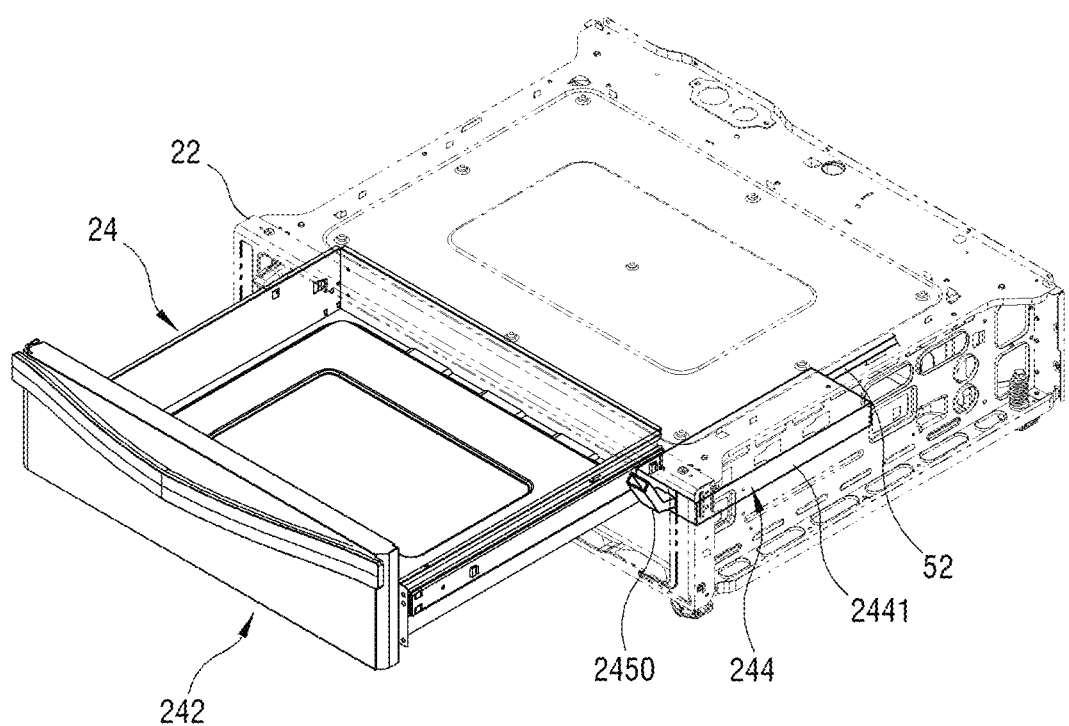
FIG. 11 is a perspective view showing an arranged state of a water tank according to a fourth embodiment of the disclosure.

FIG. 11 is a perspective view showing an arranged state of the water tank 244 according to a fourth embodiment of the disclosure. Unlike the first to third embodiments, the water tank 244 according to the fourth embodiment is not separable from the storage compartment 24, and the storage compartment 24 includes a water inlet 2450 through which water is filled.

Referring to FIG. 11, the water tank 244 may be detachably supported at the right side of the drawer 242 of the storage compartment 24. The water tank 244 includes the storage main body 2441 having a space for storing water, and the water inlet 2450 provided in the front of the storage main body 2441. The storage main body 2441 may include the water supplying pipe 52 detachably connected to the back thereof. Alternatively, the storage main body 2441 and the water supplying pipe 52 may be connected by the connector 2445 (see FIG. 6) according to the first embodiment. The water tank 244 according to the fourth embodiment may be replenished with water through the water inlet 2450 without separation. However, the water tank 244 may be detachable for other purposes such as cleaning, etc.

Although technical concept of the disclosure has been described by specific embodiments as described above, the disclosure is not limited to these embodiments. Therefore, it will be appreciated that various embodiments modified or changed by a person having an ordinary skill in the art without departing from the gist of the technical concept defined in the appended claims pertain to the scope of the disclosure.

What is claimed is:

1. A cooking apparatus comprising:
   a cooker body comprising a cooking compartment and a storage compartment below the cooking compartment;
   a drawer comprising a flat-bottomed storage space, wherein sliding the drawer into and out of the storage compartment closes and opens the storage space;
   a steam supplier configured to generate steam and supply the generated steam to the cooking compartment; and
   a water tank configured to store water for generating the steam, and provided in a portion of the storage compartment outside of the drawer, wherein opening the drawer does not interrupt a flow of water from the water tank to the steam supplier,
   wherein the steam supplier comprises: a steam generator configured to heat up water to be turned into steam, and a water supplying pipe provided in the cooker body to supply water between the water tank and the steam generator,
   wherein the water tank comprises: a storage main body, and a connector provided at the back of the storage main body,
   wherein the connector comprises: a vertical portion extended upward from the bottom of the storage main body, and a horizontal portion horizontally extended backward and arranged to be supported on the storage main body to be stationary, wherein the connector is configured to removably couple to a water flow path between the water tank and the water supplying pipe, and wherein the water tank comprises a top cover, and the connector is provided at the back end of the top cover.

2. The cooking apparatus of claim 1, further comprising a cooktop provided on the cooker body above the cooking compartment.

3. The cooking apparatus of claim 1, wherein the storage compartment comprises a water tank guide configured to support the sliding of the water tank in and out of the storage compartment.

4. The cooking apparatus of claim 3, wherein the connector is configured to removably couple to the water flow path between the water tank and the water supplying pipe based on sliding the water tank into and out of the water tank guide.

5. The cooking apparatus of claim 1, wherein the water tank is provided between the storage compartment and the cooking compartment.

6. The cooking apparatus of claim 1, wherein the storage compartment comprises a door configured to open or close the portion of the storage compartment for the water tank.

7. The cooking apparatus of claim 1, wherein:
the water tank comprises a water inlet through which water is injected, and
the water inlet is installed in the storage compartment and exposed to an outside.

8. The cooking apparatus of claim 1, further comprising a water sensor provided in the water supplying pipe and configured to detect a presence of water.

9. The cooking apparatus of claim 1, wherein the steam generator comprises:
a spray nozzle configured to spray water supplied from the water supplying pipe,
a heater configured to heat up the sprayed water to be turned into steam, and
a fan configured to circulate the steam in the cooking compartment.

10. The cooking apparatus of claim 9, wherein:
the heater surrounds the fan, and
the spray nozzle is disposed toward a rotary shaft of the fan.

11. A cooking apparatus comprising:
a drawer positioned within a storage compartment and comprising a flat-bottomed storage space, and sliding the drawer into and out of the storage compartment closes and opens the storage space;
a steam supplier configured to generate steam and supply the generated steam to a cooking compartment; and
a water tank configured to store water for generating the steam, and provided in a portion of the storage compartment outside of the drawer, wherein opening the drawer does not interrupt a flow of water from the water tank to the steam supplier,
wherein the steam supplier comprises: a steam generator configured to heat up water to be turned into steam, and a water supplying pipe provided in a cooker body to supply water between the water tank and the steam generator,
wherein the water tank comprises: a storage main body, and a connector provided at the back of the storage main body,
wherein the connector comprises: a vertical portion extended upward from the bottom of the storage main body, and a horizontal portion horizontally extended backward and arranged to be supported on the storage main body to be stationary,
wherein the connector is configured to removably couple to a water flow path between the water tank and the water supplying pipe, and
wherein the water tank comprises a top cover, and the connector is provided at the back end of the top cover.

12. The cooking apparatus of claim 11, wherein the storage compartment comprises a water tank guide configured to support the sliding of the water tank in or out of the storage compartment.

13. The cooking apparatus of claim 11, wherein the connector is configured to removably couple to the water flow path between the water tank and the water supplying pipe based on sliding the water tank into or out of the water tank guide.

* * * * *